United States Patent [19]

McClure

[11] Patent Number: 4,636,893
[45] Date of Patent: Jan. 13, 1987

[54] PIEZOELECTRIC DRIVEN MASS STORAGE

[75] Inventor: Richard J. McClure, San Diego, Calif.

[73] Assignee: Eastman Kodak Company, Rochester, N.Y.

[21] Appl. No.: 773,394

[22] Filed: Sep. 6, 1985

[51] Int. Cl.$^4$ .............................................. G11B 5/00
[52] U.S. Cl. ...................................... 360/101; 360/52; 360/63; 360/75
[58] Field of Search ...................... 360/52, 63, 101, 75

[56] References Cited

U.S. PATENT DOCUMENTS

| | | | |
|---|---|---|---|
| 3,372,242 | 3/1968 | Garrett | 360/101 |
| 3,460,120 | 8/1969 | Lichowsky | 360/101 |
| 4,099,211 | 7/1978 | Hathaway | 360/109 |
| 4,106,065 | 8/1978 | Ravizza | 360/109 |
| 4,151,569 | 4/1979 | Hathaway | 360/109 |
| 4,165,523 | 8/1979 | Hathaway | 360/107 |
| 4,188,645 | 2/1980 | Ragle et al. | 360/75 |
| 4,203,140 | 5/1980 | Watanabe | 360/75 |
| 4,374,402 | 2/1983 | Blessom et al. | 360/104 |

FOREIGN PATENT DOCUMENTS

| | | | |
|---|---|---|---|
| 927244 | 10/1947 | France | 360/63 |
| 429440 | 5/1974 | U.S.S.R. | 360/63 |

Primary Examiner—George G. Stellar
Attorney, Agent, or Firm—Daniel Robbins

[57] ABSTRACT

A planar array of high track density magnetic heads is mounted on a piezoelectric structural member. The heads are in contact with an area of magnetic recording medium coated onto a stationary support member located adjacent the head array structure. A repetitive ramp voltage is applied to the piezoelectric member causing repetitive linear extension of the member with resultant relative motion between the head array and the medium. A position transducer provides a feedback signal which monitors the position of the head array in relation to the magnetic medium, and this feedback signal is used to servo control the motion of the head array. Recording and playback of the stored information occurs coincidentally with the movement of the head array relative to the medium.

4 Claims, 7 Drawing Figures

PIEZOELECTRIC DRIVEN MASS STORAGE

BACKGROUND OF THE INVENTION

1. Field of the Invention

This invention relates to a digital information storage device, and in particular to a storage device utilizing magnetic recording.

2. Description Relative to the Prior Art

Modern data processing and computer systems require memory devices for the storage of both programs and data, the size and capacity of the memory depending upon system organization and application. The simplest system may only incorporate a modest amount of semiconductor memory, while a larger more complex system may use a variety of memory devices to fulfill system requirements for intermediate and mass storage.

Magnetic recording of the information is one of the most widely used techniques in such data storage devices. Floppy disk drives, hard disk drives, and tape recording units employ magnetic recording, and these units are available with a wide variety of operating characteristics and storage capacities. They are currently employed, in one form or another, as storage units in most data processing and computer systems.

In the aforementioned devices, relative motion between a magnetic medium and a magnetic head is an essential requirement in effecting the storage of the information. This requirement arises for two reasons. First, the data occurs as one or more time sequential streams of digital bits, and it is necessary to lay down the recorded bit pattern on the medium in a spatial distribution corresponding to the data bit stream. During recording, as the record head gap moves relative to the medium, a data pattern of magnetization is, thus, impressed on the storage medium in accordance with the input data stream. Second, the majority of playback heads of the prior art are sensitive to the rate of change of flux intercepted by the head winding. That is, the recorded fixed flux patterns stored on the medium must move relative to the playback head gap in order to generate a changing flux and hence an induced signal voltage in the head. Both requirements necessitate movement of the medium relative to the head. In general, in the prior art, electromechanical units are used to provide the required motion. In the floppy disk drive, the hard disk drive, and the tape recording unit, the magnetic medium is moved past the magnetic head by means of an electromechanical transducer, e.g., an electric motor. In another storage device, viz. the helical scan recorder, the medium is moved slowly past a high speed rotating head driven by an electromechanical motor. The use of such motors to provide the relative motion between the head and the medium is a common characteristic of many prior art magnetic storage systems.

Additionally, such magnetic storage systems utilize other electromechanical devices in their operation. Disk drives commonly employ electromechanical actuators to position the magnetic head in relation to the recorded tracks of the disk, and most tape recorders employ actuators to urge the tape against a rotating capstan and thereby provide tape motion relative to a fixed magnetic head. Such electromechanical motors and actuators generally contain precision mechanical components, and are inherently expensive. These devices are called upon to perform many repetitive mechanical operations, and must retain their mechanical precision in spite of the wear caused by application of frictional forces over extended operating periods. They also require considerable expenditure of electrical power for their operation.

The present invention provides a magnetic digital data storage device that does not rely on such electromechanical transducers to provide relative motion between head and tape and is, therefore, not subject to above mentioned difficulties.

SUMMARY OF THE INVENTION

A planar array of high track density magnetic heads is mounted on a piezoelectric structural member. The heads are in contact with an area of magnetic recording medium coated onto a stationary support member located adjacent to the head array structure. A repetitive ramp voltage is applied to the piezoelectric member causing repetitive linear extension of the member with resultant relative motion between the head array and the medium. While it is well known that piezoelectric displacements are minute, the repetitive positioning of the planar array of magnetic heads by piezoelectric means provides access to substantially the entire surface of the magnetic medium for the purposes of recording and playback. A position transducer provides a feedback signal which monitors the position of the head array in relation to the magnetic medium, and this feedback signal is used to servo control the motion of the head array. Recording and playback of the stored information occurs coincidentally with the movement of the head array relative to the medium.

In a preferred embodiment of the invention, the mechanical structure of the device comprises simple beams rigidly assembled on a supporting base. The piezoelectric moving member requires no precision machined parts, and there are no bearing mounted elements subject to wear.

To eliminate differential shifts between the head array and the magnetic medium due to temperature effects which would adversely affect registration between head and recorded data, the relevant structural members are fabricated from materials which have the same coefficient of temperature expansion.

DESCRIPTION OF THE INVENTION

The invention will be described with reference to the figures of which.

Figure 1:
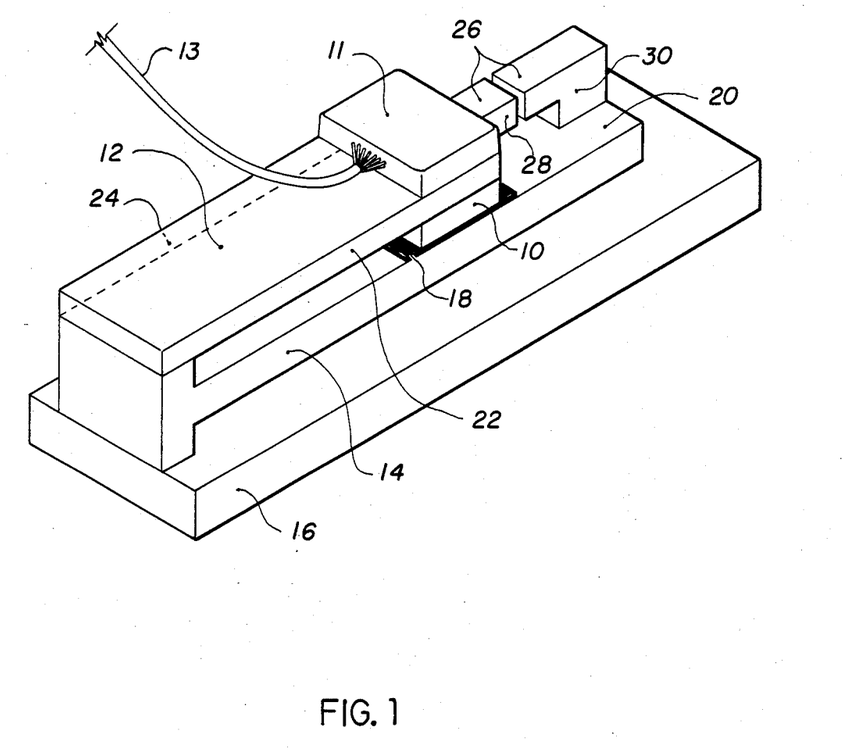
FIG. 1 is a perspective view of one embodiment of the invention.
Figure 2:
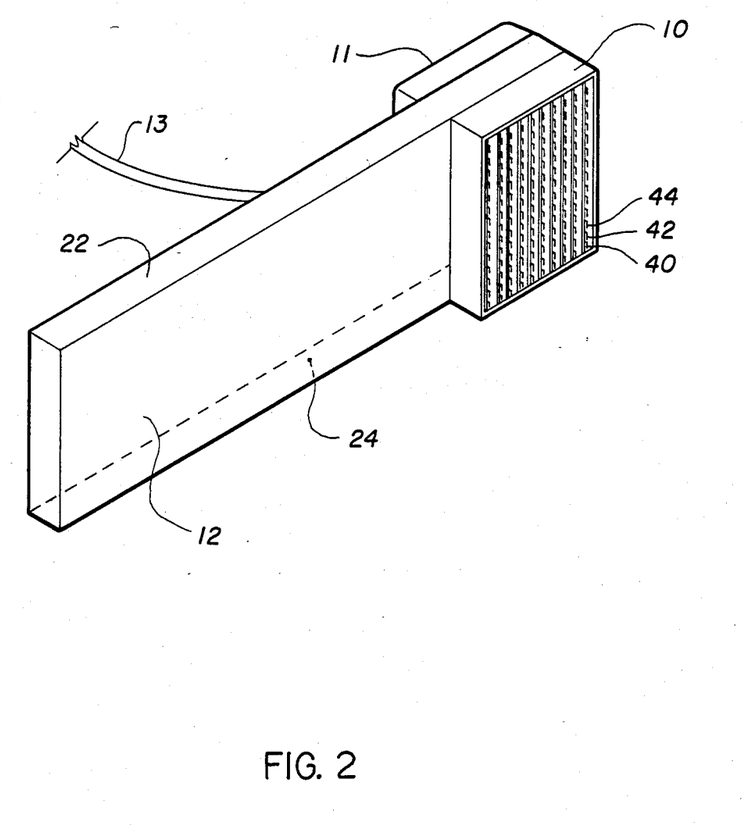
FIG. 2 is a perspective view of the head array and head support member of FIG. 1.

Referring to FIGS. 1 and 2, a multi-channel magnetic head array 10 is affixed at one end of a longitudinally extensible piezoelectric member 12. The opposite end of the member 12 is joined to a structural member 14 and the rigid assembly of the members 12, 14 is mounted on a fixed base 16. A magnetic recording medium 18 is coated on part of the surface 20 of the member 14, and the medium 18 covers a greater area of the surface 20 than the surface area of the magnetic head array 10. The magnetic head array 10 is in intimate and sliding contact with the magnetic medium over the entire area of the head array 10. Upon application of a voltage of suitable polarity to the sides 22, 24 of the member 12, the member 12 increaes in length due to its piezoelectric characteristic and moves the head array 10 relative to the fixed magnetic medium 18. As the coated medium 18 has been made sufficiently greater in area than the head array 10 surface, the head array 10 maintains contact with the medium 18 during the entire extension of the member 12. This relative movement between the head array 10 and the medium 18 allows the recording and playback of digital information in a manner to be later described.

The position and velocity of the head array 10 relative to the medium 18 must be accurately controlled during both recording and playback. During recording, constant velocity insures uniform linear density of the recorded flux, and during playback is insures accurate timing of the recovered digital signals. Accurate position information is necessary in order to establish constant velocity between the head and medium. A capacitative transducer 26 has one element 28 rigidly fastened to the piezoelectric member 12 and moves with the member 12, while the other element 30 of the capacitative transducer 26 is fixed to the support member 14 carrying the magnetic medium 18. The opposing end faces of the elements 28, 30 are metallized and the change in capacitance between such faces as the member 12 moves relative to the member 14 is proportional to the distance moved.

Compensation for temperature expansion and contraction is provided to insure proper alignment between the head array 10 and the magnetic medium 18. The support member 14 and the elements of the transducer 26 are made of the same material as the piezoelectric extensible member 12. This allows the members 12, 14 and the capacitative elements 28, 30 to expand and contract uniformly as the temperature changes with no attendant relative motion among such members and elements. In this way, proper spatial relationships are maintained. No use is made of the piezoelectric characteristics of the member 14 and of the elements 28, 30; only the sameness of the temperature coefficient of expansion with that of the member 12 is important to the performance of the device.

Figure 3:
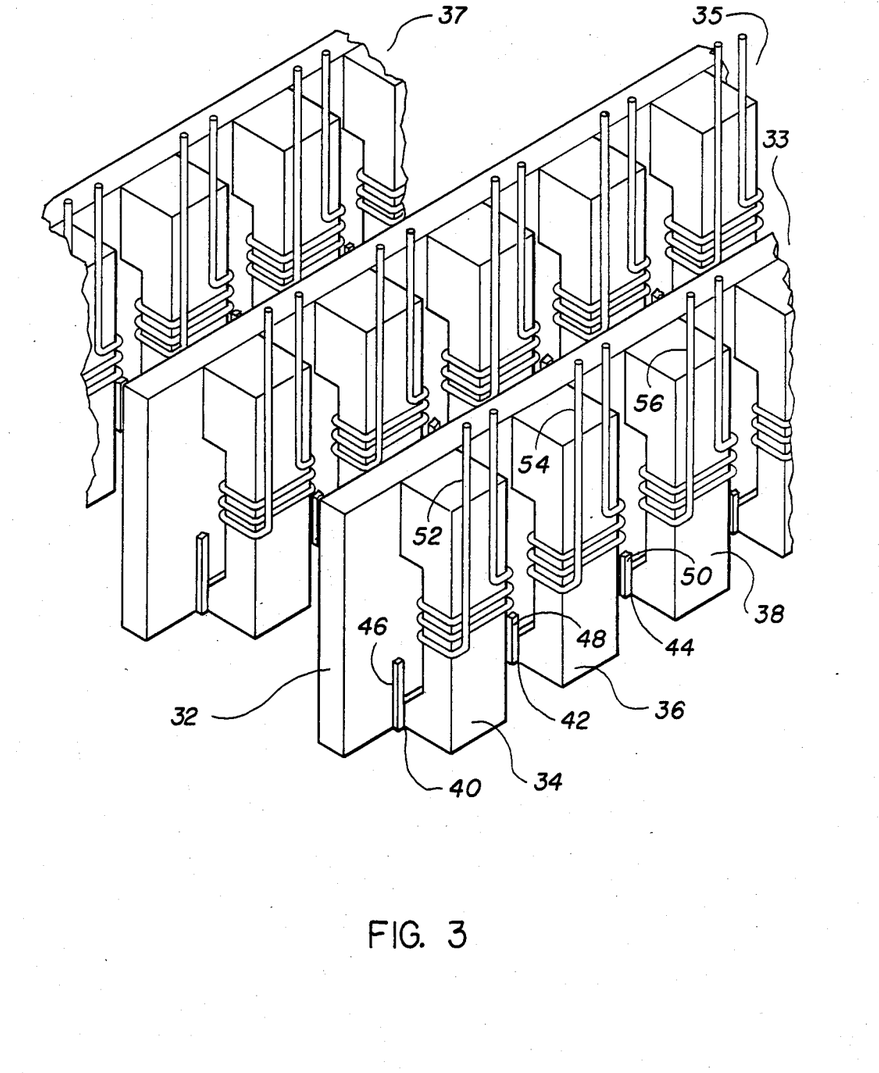
FIG. 3 is an exploded view of the assembly of individual magnetic structures of the head array of the present invention.

A further understanding of the head array 10 of the invention may be had by reference to Figs. 2 and 3. it will be appreciated that rows of magnetic structures comprise the head array 10, of which the rows 33, 35, 37 are typical. A typical row consists of a magnetic ferrite substrate 32, and a series of ferrite core structures 34, 36, 38 abutting the substrate 32. Recording/playback gaps 40, 42, 44 are formed at the junction of the ferrite substrate 32 and the ferrite cores 34, 36, 38. In a preferred embodiment of the invention, magneto-resistive elements 46, 48, 50 are fabricated within the gaps 40, 42, 44. The use of a magneto-resistive element in the gap of a playback head is known in the prior art. Such an element provides a high playback signal level, and such a signal is conducive to signal multiplexing as practiced in the present embodiment of the invention. Windings 52, 54, 56 are also provided on the core structures 34, 36, 38 to effect recording by generating flux at the gaps 40, 42, 44 when current flows through such windings.

The rows of magnetic structures 33, 35, 37 are assembled into the array 10 as illustrated in FIG. 2. The lines of the core gaps 40, 42, 44 are oriented perpendicular to the direction of the piezoelectric extension of the member 12. Connections to the record windings, e.g. 52, 54, 56 and to the magneto-resistive elements, e.g. 46, 48, 50, are made by means of a connector 11 provided with a connecting cable 13.

Figure 4:
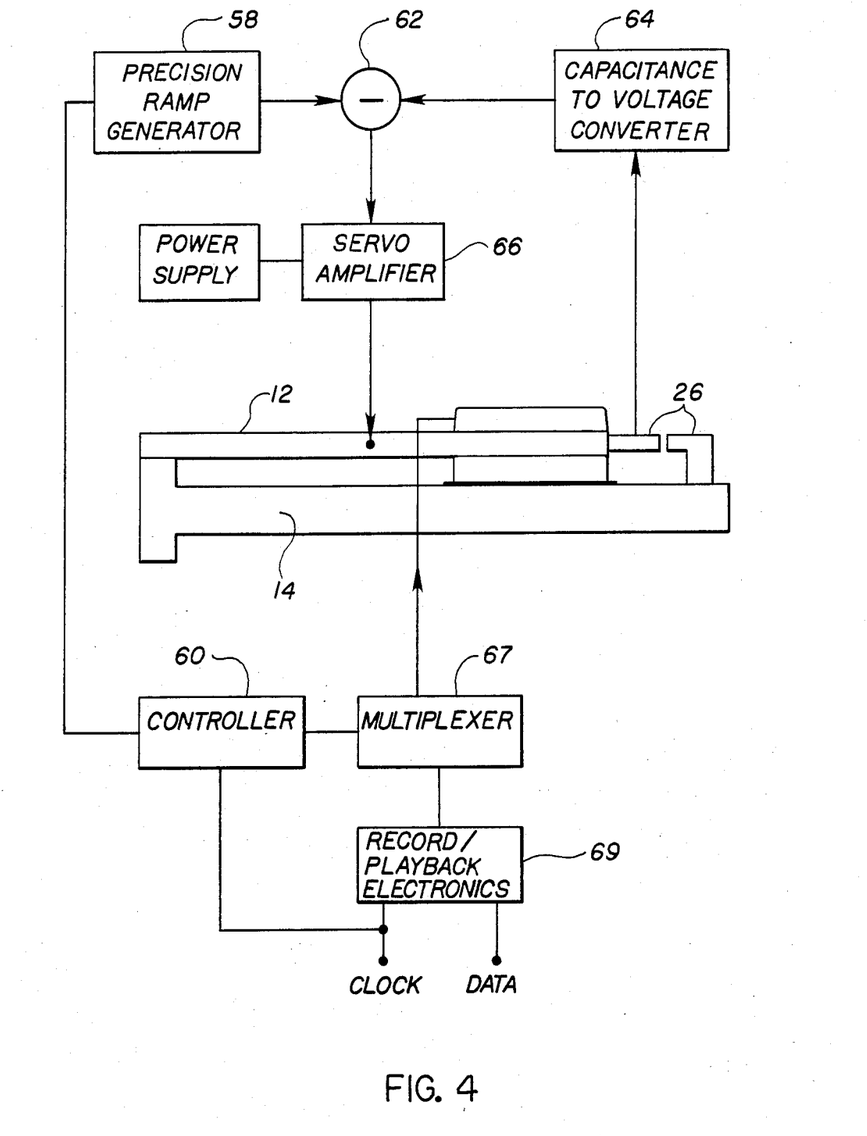
FIG. 4 is a block diagram of the head positioning servo of the invention.

By referring to FIG. 4, the operation of the present invention may be understood in the recording and playback of a stream of digital data. A precision ramp generator 58, under control of a controller 60, applies a linearly rising voltage to a differencing circuit 62, and the difference between the linearly rising voltage and the output of a capacitance-to-voltage converter 64 (any one of a type well known in the art) applied to the other input of the differencing circuit 62 drives a servo amplifier 66. The voltage output of the servo amplifier 66 is applied to the piezoelectric member 12 causing linear movement of the head array 10 relative to the magnetic medium 18 coated on the stationary member 14. During the motion of the member 12, the capacitance transducer 26 measures the distance travelled by the head array 10 and provides the input to the capacitance-to-voltage converter 64. The output voltage of the capacitance-to-voltage converter 64 is therefore proportional to the distance moved by the member 12 under control of the servo amplifier 66, and closed loop servo action drives the difference between the position called for by the ramp voltage and the actual position, as measured by means of the capacitance transducer, towards zero.

Figure 5:
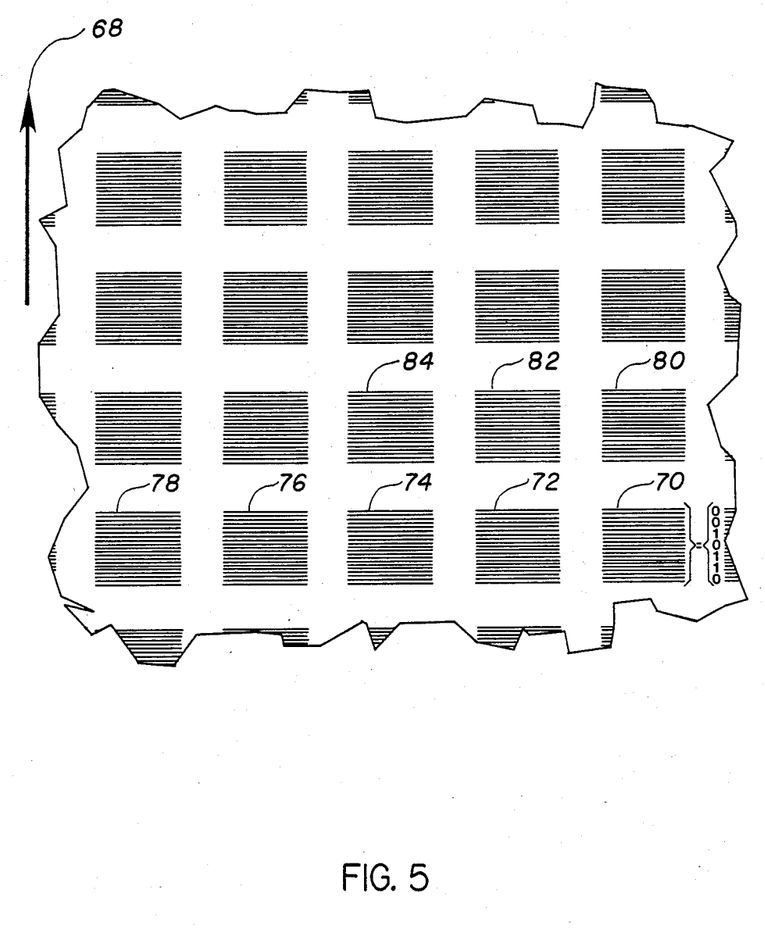
FIG. 5 is a schematic representation of the recorded information pattern on the magnetic medium, which pattern is according to the present invention.

The record mode of the present embodiment of the invention will first be described, with emphasis on the actual recording format of the invention. Recalling the head array 10 arrangement as shown in FIG. 3, the corresponding pattern of recorded bits laid down on the magnetic medium 18 is schematically represented in FIG. 5. The direction of the head array 10 movement relative to the medium 18 is designated by an arrow 68. In the recording of a sequential bit stream, a given core, say the core 34, will have record current flowing in its winding 52 during one sweep of the ramp voltage. A recorded bit pattern such as 70 will be laid down on the medium 18 during such a sweep and during the resultant movement of the head array 10. At the conclusion of a sweep, the ramp voltage is reset and the member 12 returns to its original unextended length. The data lines are switched from the core 34 to the next core of the row 33, viz. the core 36, by means of a multiplexer 67. The generation of the ramp voltage is repeated, and recording again ensues using the core 36 which generates a recorded pattern 72. This process is repeated; for each ramped movement of the head array 10 sequential patterns 74, 76, 78 are recorded by the cores of the row involved. When the row capacity is exhausted, the controller 60 switches the multiplexer 67 to the next row, e.g. row 35, and the recording process continues, generating additional patterns, 80, 82, 84, etc. In this manner, the data of the input stream is successively recorded in sequentially arranged patterns across the surface of the medium 18. It will be appreciated from the pattern of recorded information of FIG. 5, that the dimension between rows (FIG. 3, 33, 35, 37) is greater than the movement of the piezoelectric member 12.

Figure 6:
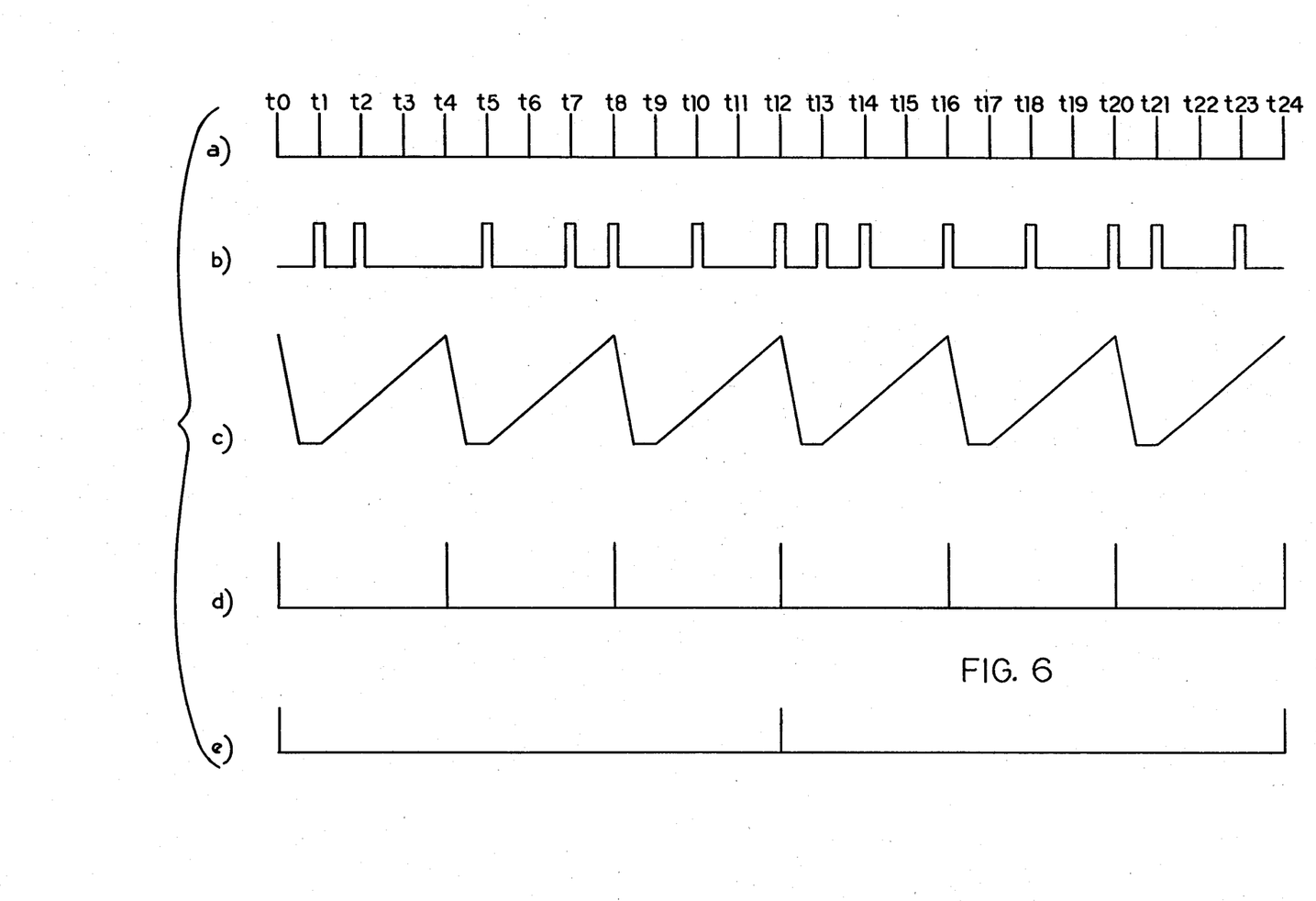
FIG. 6 illustrates waveforms useful in understanding the embodiments depicted in FIGS. 4 and 7.

Referring to the waveforms of FIG. 6, the timing of the above described events and the operation of the controller 60 and the multiplexer 67 may be understood. FIG. 6a illustrates a stream of clock pulses used for timing, and FIG. 6b represents the data to be recorded. The data consists of a series of 0's and 1's occurring at various clock times. A record/playback electronics unit 69 contains recording circuits known in the art for transforming the signal represented in FIG. 6b into a current suitable for driving a record core winding, e.g. 52, 54, 56. For simplicity of exposition, operation of the present embodiment of the invention will be described in terms of the head array 10 consisting of three rows 33, 35, 37 of magnetic structures wherein each row consists of three cores and, further, that four bits of data are recorded for each sweep of the head array 10 across the medium 18. The remaining waveforms of FIG. 6 illustrate sequences of operation of the circuits of the controller 60 and the multiplexer 67. The controller 60 consists of the counters 90, 91, 92 and a record/playback selector 88, and the multiplexer 67 consists of a core sub-multiplexer 94 and a row sub-multiplexer 96. See FIG. 7.

During recording the clock pulses of FIG. 6a are selected by means of the record/playback switch 86 under the control of the record/playback selector 88. The clock pulses are applied to a divide by m counter 90, m being the number of bits recorded during one sweep of the head array 10. In the present example, m equals 4, and the counter 90 produces a pulse for every 4 clock pulses, as shown in FIG. 6d. The output pulse of the counter 90 is applied to two circuits; the precision ramp generator 58 and a divide by n counter 91.

The ramp generator 58 is of a type known in the art whereby the ramp is initiated by an externally applied start pulse, and is terminated by an externally supplied stop pulse. The output of the counter 90 is applied to the ramp generator 58 as a stop pulse, resetting the ramp as shown in FIG. 6c. The next occurring clock pulse is applied to the ramp generator 58 as a start pulse. For example, at time t12, the counter 90 resets the ramp generator 58, and clock pulse t13 restarts it. The data occurring at t13, t14, t15, and t16 are recorded during the corresponding ramp time, until the ramp is reset by the output of the counter 90 at t16.

As noted above, the output of the counter 90 is also applied to the input of the divide by n counter 91, n being equal to the number of cores per row, which in the present description equals 3. The counter 91 is a binary stage counter which emits an output pulse and recycles for each count of 3 input pulses. The states of the binary counter 91 are also brought out and control the operation of the core sub-multiplexer 94. The output pulse of the counter 91, FIG. 6e, also feeds a divide by N counter 92, N being equal to the number of rows of cores per array, which in the present description equals 3. The states of the binary counter 92 are also brought out and control the operation of the row sub-multiplexer 96.

Figure 7:
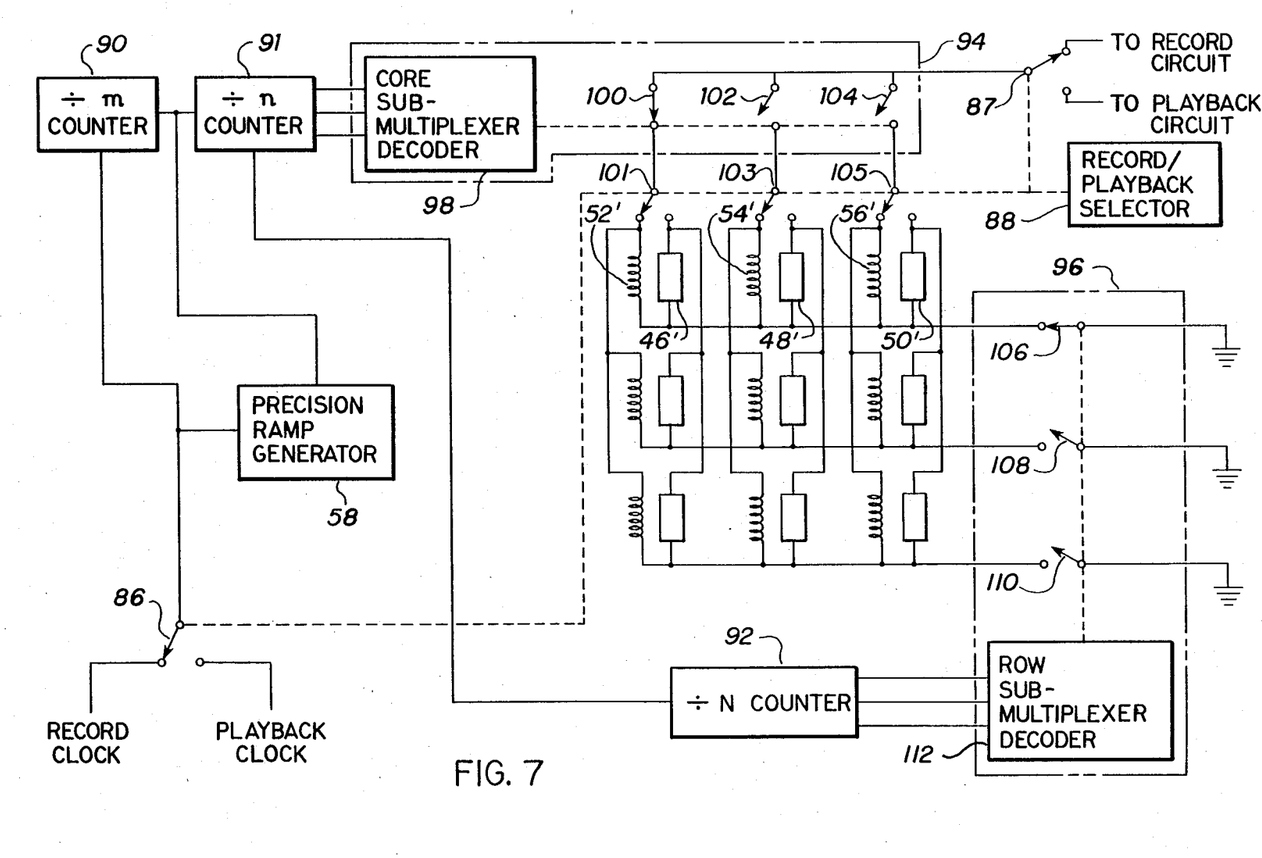
FIG. 7 is a block diagram of apparatus embodying the invention.

During recording, the switches 101, 103, 105 connect the core windings 52', 54', 56' to the multiplexer switches 100, 102, 104. [In the drawings, different but related elements are identified with the same reference character, albeit that such corresponding elements in the various drawings are distinguished by the use of primes.] The common connection of the multiplexer switches 100, 102, 104 is connected to the record circuits through a contact 87 associated with the record/playback selector 88. A decoder portion 98 of the core sub-multiplexer 94 accepts signals from the binary stages of the counter 91 which are the encoded values of the count present in the counter 91. The multiplexer decoder 98, decodes such inputs and closes the switch 100, 102, or 104 corresponding to the count in the counter 91. Similarly, binary stage outputs of the counter 92 control the sub-multiplexer 96. As previously described, the counter 92 is driven by the output pulse from the counter 91. The row sub-multiplexer 96, therefore, changes configuration each time the counter 91 cycles through the number of cores per row; i.e., the row sub-multiplexer 96 selects the row of the head array to be activated. One of the switches 106, 108, 110 then closes according to the binary count in the counter 92.

The sub-multiplexers 94, 96 may be implemented using "off the shelf" semiconductor multiplexer chips. A typical 16 channel CMOS analog multiplexer unit, which is suitable as a building block for the sub-multiplexers 94, 96 of the present embodiment of the invention, is the IH616 multiplexer manufactured by G.E.-/Intersil, Cupertino, Calif.

The prior discussion relates to operation of the present embodiment of the invention during the record mode. During the playback mode, the movement of the head array 10 and the operation of the controller 60 and multiplexer 67 are the same as during the record mode. The record-playback selector 88, now however, (1.) transfers signals from the record-playback electronics 69 to the playback circuits by means of the switch 87, (2.) switches from the record clock to the playback clock, and (3.) switches the core connections from the core windings 52', 54', 56' to the magneto-resistive elements 46', 48', 50'. The playback clock may be generated in the record/playback electronics unit 69 by means of self-clocking codes wherein the clock is derived from the played-back data itself, as is known in the art.

Based on the aforesaid description, it will be appreciated that, by use of an areally disposed array of magnetic cores, recording can be effected in the form of discrete islands of coded data upon a recording medium, whereby random addressing is facilitated as compared with prior art longitudinal recording. As an added feature, it will be further appreciated that, recording pursuant to the invention has the desirable effect of facilitating synchronization. This may be seen from the fact that discrete . . . and easily identified . . . "islands" are singularly representative of such synchronization information.

The invention has been described in detail with particular reference to preferred embodiments thereof, but it will be understood that variations and modifications can be effected within the spirit and scope of the invention.

What is claimed is:

1. Apparatus for the magnetic recording and playback of digital information, comprising:
   a. a magnetic transducer comprising a planar array of magnetic cores arranged in rows and columns,
   b. means for supporting a magnetic medium comprised of a planar surface of magnetic material, said means for supporting being cooperative with said magnetic transducer for the recording and playback of said information on and from said medium, and
   c. piezoelectric displacement means for cyclically effecting the movement of said array of magnetic cores relative to said means for supporting, wherein said cores contact substantially all of said magnetic medium surface for the purpose of recording and playback of said information.

2. A method of magnetic recording and playback of digital information on a magnetic medium by use of a transducer having an array of magnetic cores arranged in rows and columns, said transducer being mounted on a piezoelectrically extensible member, said method comprising the steps of:
   a. piezoelectrically extending and retracting said extensible member, resulting in cyclical movement of said array across said medium in a direction parallel to said columns,
   b. during said movement of said array for recording, selectively energizing said cores to form thereby areally disposed islands of recorded information within said medium, and
   c. during said movement of said array for playback, selecting said cores for playback of said islands of recorded information.

3. The method of claim 2 wherein the maximum displacement of said array during said movement is less than the row-to-row separation of said magnetic cores.

4. Apparatus for the magnetic recording and playback of digital information, comprising:
   a. first and second structural members adjacently disposed for relative movement, wherein said first structural member is of a piezoelectric material and is disposed for longitudinal extension, and said second structural member is rigidly disposed,
   b. magnetic medium means for the storage of said information, said magnetic medium means being mounted on said second structural member,
   c. a magnetic transducer mounted on said first structural member, said magnetic transducer comprising a planar array of magnetic cores disposed for recording and playback of said digital information, wherein said cores cooperate with said magnetic medium so that, in effecting recording, isolated recorded zones are areally disposed on said magnetic medium means, and in effecting playback, said cores are disposed for playback of said recorded zones, and
   d. electrical excitation means drivingly associated with said first structural member, wherein said first member is piezoelectrically extended and retracted to provide relative movement between said transducer and said magnetic medium means for the recording and playback of said information.

* * * * *